March 28, 1944. N. H. COPP 2,344,971
ANTISKID CHAIN FOR VEHICLES
Filed June 18, 1942  2 Sheets-Sheet 1
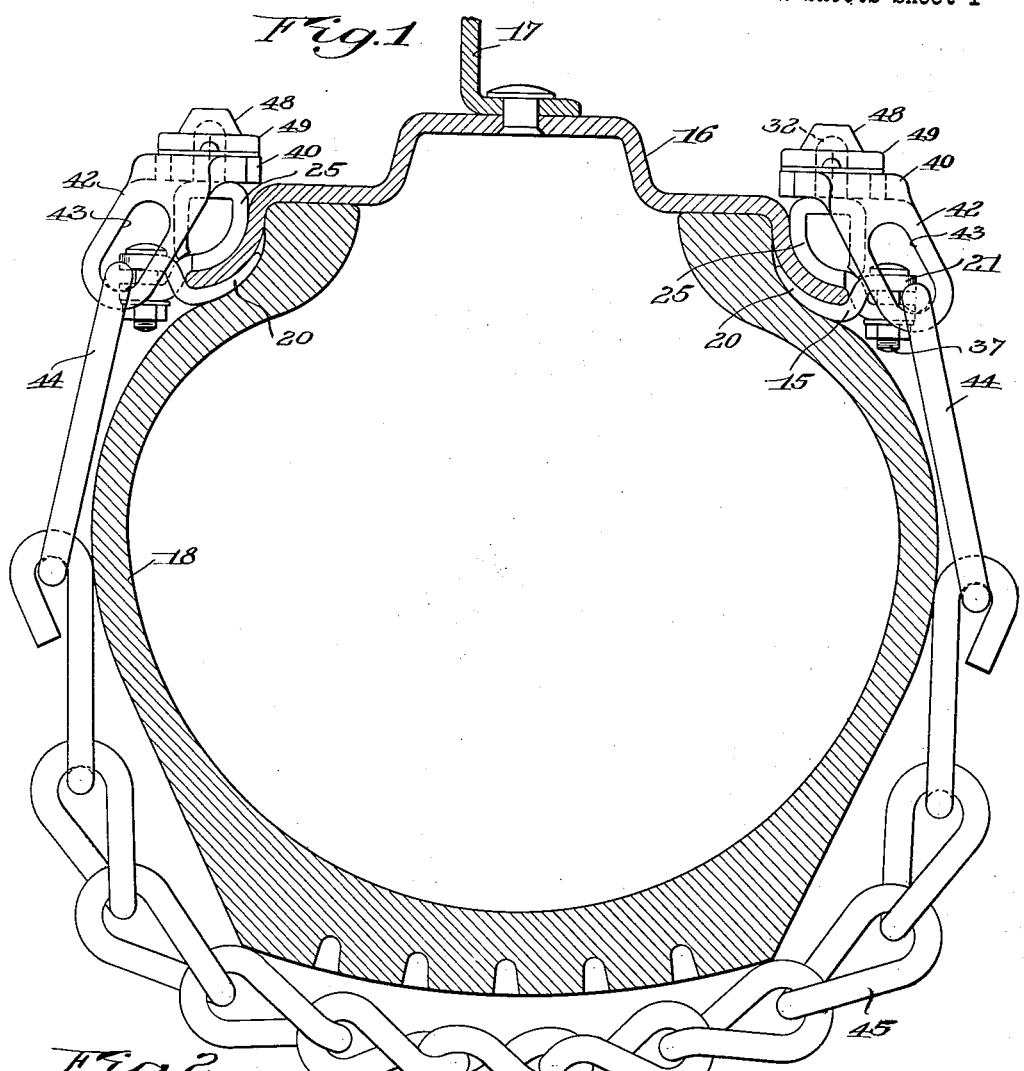
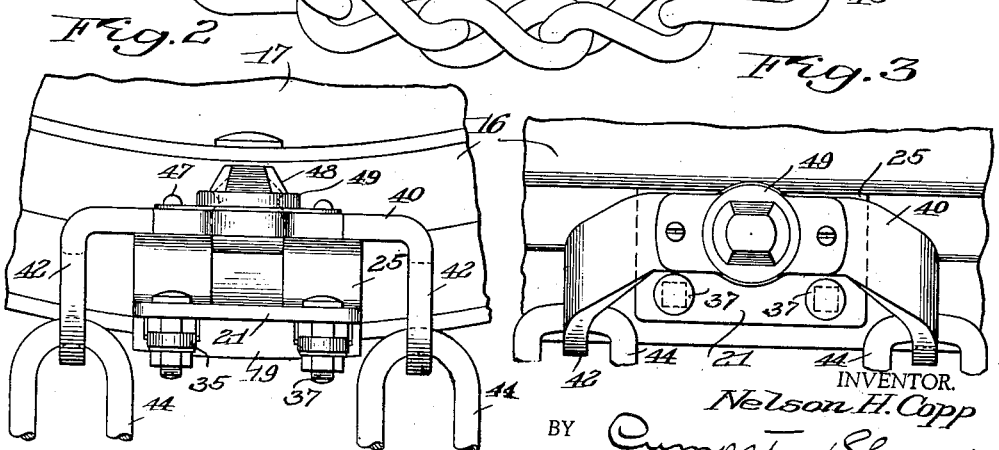
INVENTOR.
Nelson H. Copp
BY Crumpston & Shepard
his Attorneys

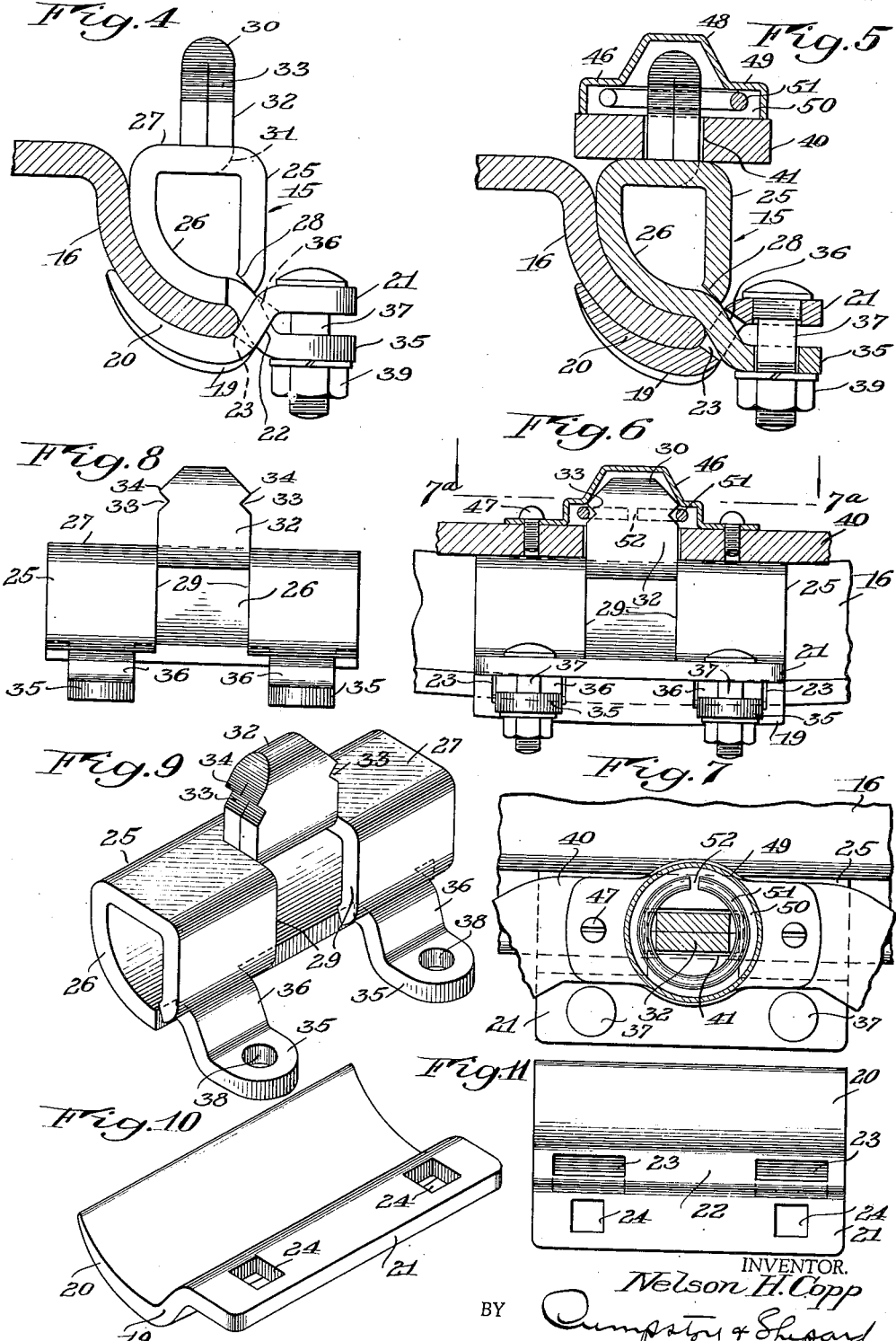

Patented Mar. 28, 1944

2,344,971

UNITED STATES PATENT OFFICE 2,344,971

ANTISKID CHAIN FOR VEHICLES

Nelson H. Copp, Rochester, N. Y., assignor of one-half to Harold J. Nagle and one-half to Reginald A. Nagle, both of Rochester, N. Y.

Application June 18, 1942, Serial No. 447,513

9 Claims. (Cl. 152—233)

This invention relates to antiskid chains for the tires of vehicle wheels. The "full" or standard type of chains heretofore largely employed comprises chains extending circumferentially at the sides of the tire and connected across the tread by spaced cross chains. Changing vehicle design has decreased the accessibility of the wheels and made it a more and more difficult and dirty job to apply and remove this circumferential type of chain, with resulting restriction of their use, even when made advisable by existing road conditions, and efforts have been made to devise suitable ways of attaching separate cross chains, or groups of cross chains, directly to the periphery of the wheel at points spaced circumferentially thereof and brought to an accessible position by rotation of the wheel. One object of the invention is to provide improved cross chain attaching means capable of being manufactured more economically and more easily applied to and removed from the wheel in use.

Another object is to provide a device of the above described nature with provision for housing and protecting the co-acting parts against obstruction by ice and mud and so maintaining them in condition for easy and quick attachment or removal of the chains.

To these and other ends the invention resides in certain improvements and combinations of parts, all as will be hereinafter more fully described, the novel features being pointed out in the claims at the end of the specification.

In the drawings:

Fig. 1 is a transverse, sectional view of the rim and tire of the automobile wheel, showing my invention applied thereto;

Fig. 2 is a reduced, fragmentary, side elevation of chain attaching parts shown in Fig. 1;

Fig. 3 is a plan view of the parts shown in Fig. 2;

Fig. 4 is an enlarged side elevation of a rim clamp forming part of the present embodiment;

Fig. 5 is a similar view in section with a chain attaching yoke applied thereto;

Fig. 6 is a side elevation as viewed from the right in Fig. 5, with the chain yoke in section;

Fig. 7 is a plan view, partly in section, on the line 7a—7a in Fig. 6;

Fig. 8 is a side elevation of one part of the rim clamp;

Fig. 9 is a perspective view of the same;

Fig. 10 is a perspective view of another part of a rim clamp, and

Fig. 11 is a top plan view of the part shown in Fig. 10.

The present invention is in the nature of an improvement on the tire chain for vehicles disclosed in the patent to Peter J. Nagle, No. 2,171,592, with improvements residing in both the means to be clamped on the rim for holding the cross chains and the means for attaching the cross chains to the rim clamps. In the patented construction, the rim clamp is made mainly in a single piece, or body, fitted to the rim and secured by a set screw and the means for attaching the chain end to the clamp comprises parts exposed to the accumulation of ice and mud and requiring manual manipulation in order to effect the attachment and removal of the chains.

The embodiment of the invention herein disclosed, by way of illustration, comprises a rim clamp made of separately formed parts capable of being separately applied to the rim and forced into clamping engagement with opposite sides thereof, and the chain attaching parts are shielded from mud and the weather and easily and quickly manipulated by mere manual pressure of one coacting part against another.

Referring more particularly to the drawings, the clamp is indicated generally, or as a whole, at 15, on a "drop" type rim 16 on the periphery of a wheel 17 and carrying a pneumatic tire 18. The clamp proper comprises, preferably, an inner part 19 curved as at 20 to conform to and engage the inner side of the rim. Portion 20 is preferably tapered to a relatively thin end, as shown. The edge of such a rim is commonly curved radially outwardly and away from the plane of the wheel, as shown, and the tapered portion 20 of the clamp part may be readily inserted between the rim and the tire by slightly separating them with a tool, with such deflation of the tire as may be desirable for the purpose. This part 19 of the clamp has an extension 21 which is curved inwardly around the edge of the rim, as at 22, and thence outwardly at right angles to the plane of the wheel, as shown. This extension portion is preferably formed, at the curved part 22, with a pair of rectangular openings 23 and adjacent its outer edge with a pair of rectangular openings 24, for purposes which will be hereafter described.

The rim clamp comprises also an outer part 25 which, like the inner part 19, may be readily and economically died out and formed up from sheet steel of suitable thickness. Outer part 25 has a portion 26 which is curved to conform to and firmly engage the outer side of the rim edge and has at its upper edge an extended portion which is first formed outwardly as at 27, normal to the plane of the wheel, to provide a seat portion for receiving the anchoring member, or yoke, on the end of the cross chain. Beyond the seat portion 27, part 25 is turned in a radially outward direction with its end 28 terminated adjacent the portion 26 which engages the rim. Part 25 is thus formed in a box-like or channel shape having substantial strength and rigidity.

Outer clamp part 25, for the attachment thereto of the cross chain, is preferably formed at its edge 28 with a pair of spaced cuts 29 extending inwardly to about the center of seat 27 and the tongue thus separated is preferably turned reversely upon itself, as at 30, and formed as at 31 to project at right angles to seat 27 and provide a post-like lug 32, as shown. The opposite side edges of the lug are preferably grooved laterally inwardly to form recesses 33 including laterally projecting shoulders 34, for a purpose to be presently described. The outer end of the lug is preferably beveled or tapered to a somewhat pointed extremity, as shown, to facilitate the application thereto of the anchoring member for the chains.

Outer clamp part 25 has at its other edge a pair of extensions 35 which are first curved outwardly around the edge of the rim as at 36 and then turned outwardly to extend normally to the plane of the wheel. These extensions are shaped and dimensioned for insertion through the openings 23, respectively, of the inner part 19, as shown in Figs. 4 and 5. In applying the clamp to the rim the inner part 19 is preferably first inserted in place, as described, and the outer part is then located on the outside of the rim with its extensions 35 crossing through and fulcrumed on the extension 21 of the inner part, with the extensions 21 and 35 in spaced, parallel relation, as shown. Bolts 37, with shouldered head portions seated in the rectangular openings 24 of the inner part extension 21 and passing through suitable openings 38 in extensions 35, are provided with washers and with nuts 39, by means of which the extensions 21 and 35 may be drawn together to cause the inner and outer parts 19 and 25 to forcefully clamp the opposite sides of the edge of the rim. While the clamped portion of the rim edge conforms, of course, to the circumferential curvature of the wheel, the part 25 is preferably straight so that its end edges meet the rim surface at a slight angle and tend to "dig" into and firmly grip the rim surface, the outer part 19 being slightly curved, preferably, to conform to the circumferential curvature of the rim.

The anchoring member, for attaching the end of the cross chain to the above described clamp, is preferably in the nature of a yoke 40, Figs. 2, 3 and 5 to 7, inclusive, formed with a rectangular central opening 41 adapted to be received by lug 32 and to rest upon the clamp seat 27. The central bar of the yoke is curved at its ends to provide spaced arms 42 extending along the sides of the tire and having openings 43 for engagement with links 44 at the ends of the cross chains 45.

The means for detachably securing the chain yoke 40 to the rim clamp comprises, preferably, a sheet metal housing 46 secured as by means of screws 47 on the outer face of yoke 40 concentric with the opening therein. The central dome-like portion 48 of the housing rises to a sufficient height to clear the end of lug 32 when inserted through the yoke opening. Around the dome 48 the housing has a portion 49 of less height but greater diameter, providing a circular chamber 50 in which is loosely retained a resilient element or spring, 51, preferably a ring of resilient wire with a gap 52 to permit it to expand and contract. Ring 51 is of such diameter as to closely embrace lug 32 within its recess 33, as shown in Fig. 6. When yoke 40 is moved to insert lug 32 upwardly through its opening 41, the reduced upper end of the lug engages within spring 51 and expands it until the yoke rests upon the clamp seat 27 when the ring snaps into lug recess 33 and yieldably holds the yoke on the clamp. Similarly, when the yoke is pressed upwardly and off the lug, spring 51 is expanded by the lateral shoulder 34 of the lug until the ring snaps over it, thereby releasing the yoke for removal, merely a slight pressure on the yoke being sufficient to effect its attachment to and removal from the clamp as described. This pressure actuated device for releasably securing the cross chain anchoring member to the lug on the rim clamp is disclosed and claimed in my copending application, Serial No. 447,512, filed June 18, 1942.

The operation of the device will be clear from the explanation accompanying the above description of its construction, and it will be apparent that the invention accomplishes its objects. The rim clamp is so constructed that it can be readily and economically formed up from metal plate. The arrangement of the parts is such that they are readily and quickly applied and securely attached to the rim, at one or more points circumferentially thereof, in accordance with the number of cross chains to be employed, the clamps being applied in pairs and alined with each other on opposite edges of the rim, as indicated in Fig. 1. The co-acting parts for attaching the ends of the cross chain to the clamp are relatively few and simple in nature and economical to manufacture, and the attachment and removal of the chains require no tools, nor any manual operation of the parts other than a mere manual pressure on the yoke to impale it on the clamp lug or remove it therefrom. Such parts are housed to protect them from dirt and ice and so maintained in efficient working condition. The clamps, once attached, may be left upon the rim so that the chains may be quickly and easily applied and removed, as road conditions may require, and the facility with which this may be accomplished encourages the use of the chains in all circumstances under which they add to the safety of vehicular travel.

While the invention has been herein disclosed in a preferred embodiment, such disclosure is intended by way of illustration, rather than by way of limitation, as it is contemplated that various modifications in the construction and arrangement of the parts will readily occur to those skilled in the art within the spirit of the invention and the scope of the appended claims.

I claim:

1. In an antiskid chain for the tires of vehicle wheels, a clamp for attachment to a tire receiving rim having an outwardly inclined, marginal edge portion, said clamp comprising an inner part for engaging the inner side of said edge portion, an outer part for engaging the outer side of said edge portion, said parts having extensions crossing and fulcrumed on each other, and threaded means for drawing said extensions together to press said parts into clamping engagement with opposite sides of said rim, a lug on said outer part formed with an outwardly projecting shoulder, an anchoring member having an opening therein to receive said lug, and resilient means associated with said member at said opening and actuated by pressure against said lug shoulder to snap said means thereover and hold said member on said clamp, said member having means for attachment to a traction increasing element extended across a tire on said rim.

2. In an antiskid chain for the tires of vehicle wheels, a clamp for attachment to a tire receiving rim having an outwardly inclined, marginal edge portion, said clamp comprising an inner part for engaging the inner side of said edge portion, an outer part for engaging the outer side of said edge portion, said parts being formed with extensions one of which passes through an opening in the other of said parts so as to be fulcrumed thereon, and threaded means for drawing said extensions together to press said parts into clamping engagement with opposite sides of said rim, a lug on said outer part formed with an outwardly projecting shoulder, an anchoring member having an opening therein to receive said lug, and resilient means associated with said member at said opening and actuated by pressure against said lug shoulder to snap said means thereover and hold said member on said clamp, said member having means for attachment to a traction increasing element extended across a tire on said rim.

3. In an antiskid chain for the tires of vehicle wheels, a clamp for attachment to a tire receiving rim having an outwardly inclined, marginal edge portion, said clamp comprising an inner part for engaging the inner side of said edge portion and having an apertured extension, an outer part having an intermediate section for engaging the outer side of said edge portion with an extension at one side thereof passing through the aperture in said inner part and with an extension at the other side thereof reversely bent upon itself to form a seat, threaded means for drawing said extensions together to press said parts into clamping engagement with said rim, a lug on said seat formed with an outwardly projecting shoulder, an anchoring member having an opening therein to receive said lug, and resilient means associated with said member at said opening and actuated by pressure against said lug shoulder to snap said means thereover and hold said member on said clamp, said clamp having means for attachment thereto of a traction increasing element extended across a tire on said rim.

4. In an antiskid chain for the tires of vehicle wheels, a clamp for attachment to a tire receiving rim having an outwardly inclined, marginal edge portion, said clamp comprising an inner part for engaging the inner side of said edge portion and having an apertured extension, an outer part having an intermediate section for engaging the outer side of said edge portion with an extension at one side thereof passing through the aperture in said inner part and with an extension at the other side thereof reversely bent upon itself to form a channel-shaped section with a seat thereon, threaded means for drawing said extensions together to press said parts into clamping engagement with said rim, a portion of said channel-shaped section being struck up above said seat to form a lug having an outwardly projecting shoulder adjacent its free end, an anchoring member having an opening therein to receive said lug and adapted to rest on said seat, a housing on said member about said opening and a spring ring in said housing adapted to be snapped over said lug shoulder by pressing on said member, for detachably holding said member on said seat, said member having means for attaching thereto a traction increasing element extended across a tire on said rim.

5. In an antiskid chain for the tires of vehicle wheels, a clamp for attachment to a tire receiving rim having an outwardly inclined, marginal edge portion, said clamp comprising an inner part for engaging the inner side of said edge portion, an outer part for engaging the outer side of said rim portion, said parts having extensions crossing and fulcrumed on each other, threaded means for drawing said extensions together to press said parts into clamping engagement with opposite sides of said rim, and a lug on said outer part formed with an outwardly projecting shoulder for receiving an anchoring member for a traction increasing element extended across a tire on said rim.

6. In an antiskid chain for the tires of vehicle wheels, a clamp for attachment to a tire receiving rim having an outwardly inclined, marginal edge portion, said clamp comprising an inner part for engaging the inner side of said edge portion and having an apertured extension, an outer part having an intermediate section for engaging the outer side of said edge portion with an extension at one side thereof passing through the aperture in said inner part and with an extension at the other side thereof provided with a seating surface, threaded means for drawing said extensions together to press said parts into clamping engagement with said rim, and a lug projecting from said outer part above said seating surface and provided with an outwardly projecting shoulder for receiving and retaining on said seat an anchoring means for a traction increasing element for a tire on said rim.

7. In an antiskid chain for the tires of vehicle wheels, a clamp for attachment to a tire receiving rim having an outwardly inclined, marginal edge portion, said clamp comprising an inner part for engaging the inner side of said edge portion, an outer part for engaging the outer side of said edge portion, said parts having extensions crossing and fulcrumed on each other, threaded means for drawing said extensions together to press said parts into clamping engagement with opposite sides of said rim, and means on one of said parts for anchoring a traction increasing element extended across a tire on said wheel.

8. In an antiskid chain for the tires of vehicle wheels, a clamp for attachment to a tire receiving rim having an outwardly inclined, marginal edge portion, said clamp comprising an inner part for engaging the inner side of said edge portion, an outer part for engaging the outer side of said edge portion, said parts being formed with extensions one of which passes through an opening in the other so as to be fulcrumed thereon, threaded means for drawing said extensions together to press said parts into clamping engagement with opposite sides of said rim, and means on one of said parts for anchoring a traction increasing element extended across a tire on said wheel.

9. In an antiskid chain for the tires of vehicle wheels, a clamp for attachment to a tire receiving rim having an outwardly inclined, marginal edge portion, said clamp comprising an inner part for engaging the inner side of said edge portion and having an apertured extension, an outer part having an intermediate section for engaging the outer side of said edge portion with an extension at one side thereof passing through the aperture in said inner part and with an extension at the other side thereof reversely bent upon itself to form a rigid, channel-shaped section, threaded means for drawing said extensions together to press said parts into clamping engagement with said rim, and means on said channel-shaped section for anchoring a traction increasing element extended across a tire on said wheel.

NELSON H. COPP.